(12) United States Patent
Tentrup et al.

(10) Patent No.: US 7,907,265 B2
(45) Date of Patent: Mar. 15, 2011

(54) METHOD FOR THE DETERMINATION OF THE AXLE GEOMETRY OF A VEHICLE

(75) Inventors: Thomas Tentrup, Mechern (DE); Wolfgang Brunk, Gleichen (DE); Wiprecht Keller, Syke (DE)

(73) Assignees: Dürr Assembly Products GmbH, Püttlingen (DE); Visicon Automatisierungstechnik mit beschränkter Haftung, Gleichen-Wöllmarshausen (DE)

( * ) Notice: Subject to any disclaimer, the term of this patent is extended or adjusted under 35 U.S.C. 154(b) by 92 days.

(21) Appl. No.: 12/087,212

(22) PCT Filed: Aug. 3, 2007

(86) PCT No.: PCT/DE2007/001378
§ 371 (c)(1),
(2), (4) Date: Jun. 26, 2008

(87) PCT Pub. No.: WO2008/014783
PCT Pub. Date: Feb. 7, 2008

(65) Prior Publication Data
US 2009/0046279 A1      Feb. 19, 2009

(30) Foreign Application Priority Data
Aug. 3, 2006   (DE) .................. 10 2006 036 671

(51) Int. Cl.
*G01B 11/275*     (2006.01)
(52) U.S. Cl. ............................................. 356/139.09
(58) Field of Classification Search .............. 356/139.09
See application file for complete search history.

(56) References Cited

U.S. PATENT DOCUMENTS

| | | | | |
|---|---|---|---|---|
| 4,745,469 | A | * | 5/1988 | Waldecker et al. ............. 348/94 |
| 5,731,870 | A | * | 3/1998 | Bartko et al. ............ 356/139.09 |
| 6,657,711 | B1 | * | 12/2003 | Kitagawa et al. ............. 356/155 |
| 7,230,694 | B2 | | 6/2007 | Forster et al. |
| 7,454,841 | B2 | * | 11/2008 | Burns et al. ..................... 33/288 |
| 2003/0210407 | A1 | * | 11/2003 | Xu ................. 356/611 |

FOREIGN PATENT DOCUMENTS

| | | |
|---|---|---|
| DE | 39 38 714 | 5/1991 |
| DE | 41 15 445 | 1/1992 |
| DE | 195 36 294 A1 | 4/1997 |
| DE | 197 48 239 | 5/1998 |
| DE | 103 35 829 | 3/2005 |
| DE | 10 2004 035102 | 2/2006 |
| EP | 0 280 941 | 9/1988 |
| EP | 0 867 689 A2 | 9/1998 |
| FR | 2 808 082 | 10/2001 |
| WO | WO 00/71972 | 11/2000 |
| WO | WO 2007/080012 A1 | 7/2007 |

OTHER PUBLICATIONS

International Search Report.

* cited by examiner

*Primary Examiner* — Isam Alsomiri
(74) *Attorney, Agent, or Firm* — Collard & Roe, P.C.

(57) ABSTRACT

A method is for determining the axle geometry of a vehicle, wherein light of a given structure is projected onto a vehicle wheel, and the diffusely reflected light can be analyzed in order to determine the orientation of the plane of the vehicle wheel. Several lines of a laser light generated by means of one or several laser light sources are projected on the wheel, and one or several of these lines fades in and/or out in temporal succession. The reflected light is captured by means of one or several cameras.

4 Claims, 5 Drawing Sheets

METHOD FOR THE DETERMINATION OF THE AXLE GEOMETRY OF A VEHICLE

CROSS REFERENCE TO RELATED APPLICATIONS

This application is the National Stage of PCT/DE2007/001378 filed on Aug. 3, 2007, which claims priority under 35 U.S.C. §119 of German Application No. 10 2006 036 671.9 filed on Aug. 3, 2006. The international application under PCT article 21(2) was not published in English.

BACKGROUND OF THE INVENTION

The invention relates to a method for determining the axle geometry of a vehicle.

The practice of applying marks to the surface of a tyre is known from the EP 0 280 941 AI. These marks reflect light that impinges upon them. According to the description, diffuse or structured light can be projected on the tyres and thus also on the marks. Provision is also made for a camera with which, using the method of triangulation, the orientation of the tyre surface can be determined. Effects such as raised lettering on the tyre surface can be compensated for by means of analysis methods. If wheel alignment is performed on a rotating wheel (dynamic wheel alignment), effects can be compensated for that may occur if, on account of the wheel's not having been fitted exactly, the wheel axle is not exactly perpendicular to the wheel plane. Measurements obtained during dynamic wheel alignment are averaged accordingly.

The DE 103 35 829 AI describes a method of determining a vehicle's axle geometry in which flat-coded light is projected on an area of the vehicle wheel and the diffusely reflected light is captured from a direction other than the direction of projection in order to determine from the captured light the three-dimensional surface coordinates for the topographical image of the wheel face. This method permits, among other things, determination of the wheel plane and hence of the wheel track and camber. As light source, a beamer is used that projects different colours and/or geometric patterns spread over an area.

BRIEF SUMMARY OF THE INVENTION

The object of the invention described here is to suggest an uncomplicated method of determining a vehicle's axle geometry.

This object is established according to claim 1 of the invention described here in that several lines of laser light generated by one or several laser-light sources are projected on the wheel, and one or several of these lines is/are faded in or out in temporal succession; the diffusely reflected light is captured by means of one or several cameras.

If the diffusely reflected light is captured by only one camera, the orientation and position of the camera coordinate system relative to each measuring plane generated by any one light source must be known and fixed. At the positions where the measuring planes intersect the test object, lines are formed whose coordinates are determined by means of triangulation.

If several cameras are used, stereophotogrammetry may be employed for analysis purposes. A plurality of cameras may also be analysed as stereo cameras. These forms of analysis are independent of the position of the measuring planes and thus of the exact position and orientation of the light sources. Where several cameras are used, these are expediently synchronised with respect to the points in time at which images are captured by the cameras.

The use of laser light has the advantage of a very good signal-to-noise ratio. This is especially beneficial when the invention described here is used in vehicle production.

An additional advantage of using laser light is that it is monochromatic. This permits easy filtering of light coming from other sources and of ambient illumination.

The advantage of projecting lines is that signal analysis of these lines, especially of the deformations of these lines caused by the projection on the wheels is uncomplicated.

The advantage of projecting several lines is that a large number of measuring points are recorded with each camera image, and a high measuring speed is thereby achieved at the same time.

The fact that the lines can be faded in and/or out individually has the additional advantage of making it easy to determine which of the lines detected on the wheel belongs to which of the projected lines.

To this end, in the embodiment according to claim 2, the information as to which of the lines had been faded out is supplied to an analysing unit along with an image captured by the camera or cameras.

This advantageously makes it easy to determine which of the detected lines belongs to which of the projected lines. In particular, it provides clarity in the event that, on account of the test object's contours, the detected lines can no longer be assigned unambiguously to the projected lines. In such a situation, the lines in question can be faded out in succession, thus enabling the detected and projected lines to be matched up.

With regard to the measuring speed, it proves particularly beneficial here if, during image acquisition, the particular line that has been faded in or out can be assigned unambiguously to the camera frame to be analysed.

In the embodiment according to claim 3, the lines are generated by means of several laser-light sources that can be triggered individually.

The advantage of this is the creation of a redundant system, meaning that even if one or the other of the laser-light sources fails, it is still possible to perform a measurement.

It also proves useful that, because they can be triggered individually, the laser-light sources can be switched on or off with a very short time constant. This means it is also possible to fade individual lines in and out very quickly, thereby advantageously permitting a high measuring speed and reliable results.

In the embodiment of the method according to claim 4, the lines are at least substantially horizontal, the position(s) of the laser-light source or sources being changeable in such manner that the lines impinge successively on the wheel at different heights.

This procedure advantageously enables the measuring result to be improved, because this temporal succession of different projections permits more exhaustive measurement of the wheel-plane orientation.

To change the positions of the laser-light sources, it is merely necessary to swing the projection unit through relatively small angles.

If one or more stereo camera systems are used in this embodiment, the lines run orthogonally to the baseline of the stereo camera system(s).

BRIEF DESCRIPTION OF THE SEVERAL VIEWS OF THE DRAWINGS

An embodiment of the invention is shown in the drawings, where.

DETAILED DESCRIPTION OF THE INVENTION

Figure 1:
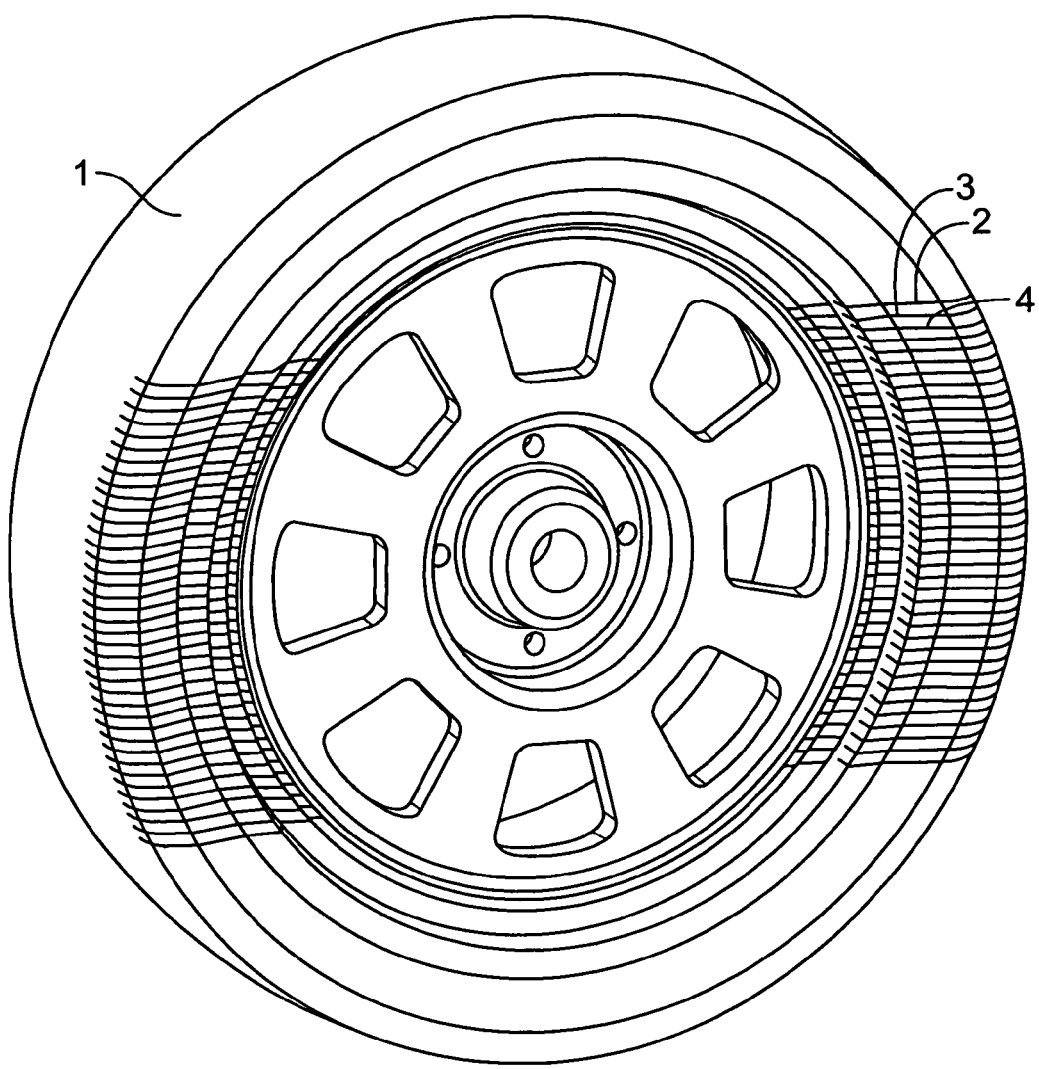
FIG. 1 illustrates a vehicle wheel on which parallel, horizontal lines are being projected.

FIG. 1 shows a vehicle wheel 1 on which parallel, horizontal lines 2, 3, 4 are being projected. It can be seen that these lines 2, 3, 4 have typical courses that corresponds to the tyre's sidewall contours. Suitable mathematical processes enable the orientation of the vehicle-wheel plane to be determined from these tyre sidewall contours.

For example, the tyre sidewall contours can be used to determine the maximum tyre-bead widths. For an ideal tyre, they lie on a circle and define a possible wheel plane. In the case of a vehicle standing on its wheels during wheel alignment, the tyre is deformed in the vicinity of the point where it contacts the floor, so that for calculating the plane, only contours can be used that are not in the vicinity of this point. On account of the tyre lettering and lateral tyre runout, one determines the orientation of the vehicle-wheel plane that is perpendicular to the wheel's axis of rotation via what is known as a reversal measurement. A reversal measurement involves averaging the vehicle-plane orientations measured during one rotation of the wheel.

Figure 2:
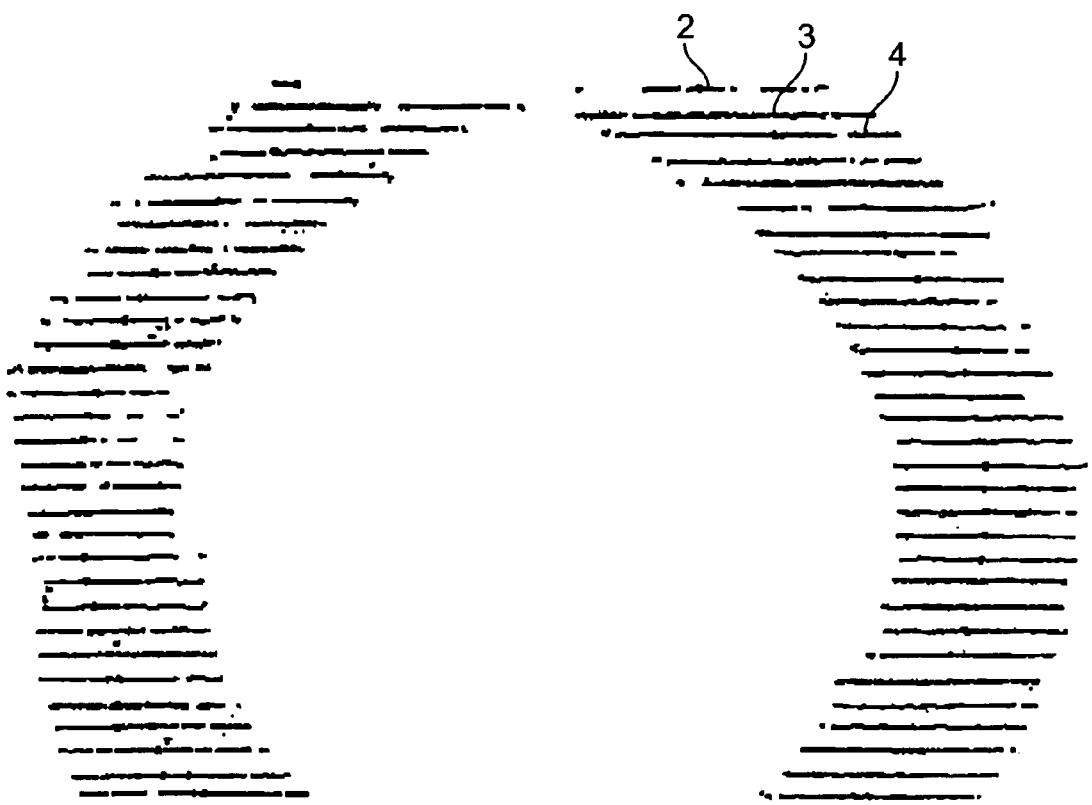
FIG. 2 shows an image in which the lines diffusely reflected by the wheel are visible.

FIG. 2 shows an image in which the lines 2, 3, 4 diffusely reflected by the wheel 1 are visible. The already mentioned deformations caused by the tyre bead are marked by small circles.

A circle can be calculated from these points. The orientation of the corresponding surface is the vehicle-wheel orientation.

Statistical methods are used to determine the position of the circle, the advantage of this being that measurement errors and deviations can be compensated.

As an alternative to the circle obtained from the tyre bead, it would also be possible, for example, to analyse the kink in the lines caused by the rim.

Figure 3:
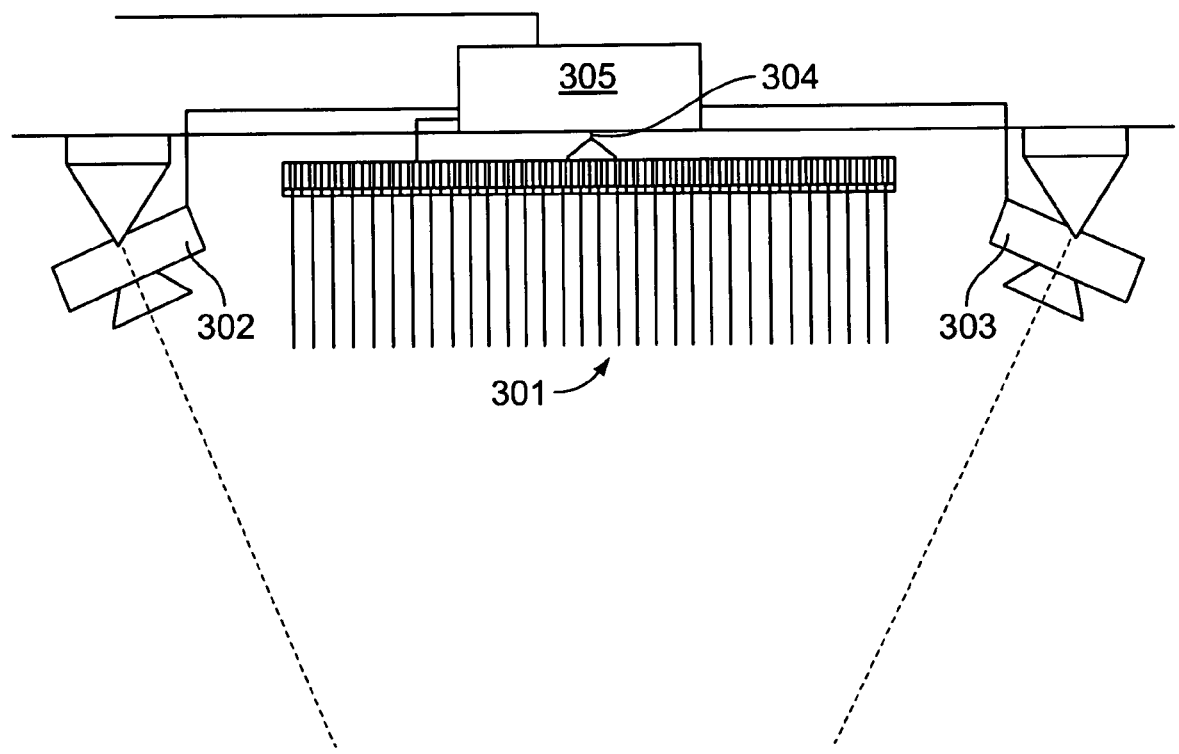
FIG. 3 is a diagram showing a measuring setup including a laser system and two cameras.

FIG. 3 is a diagram showing a measuring setup including a laser system 301 and two cameras 302 and 303.

The laser system 301 can be swivelled expediently about an axis 304 perpendicular to the plane of the drawing. The number of measuring points on the wheel can thereby be advantageously increased.

In the embodiment shown, the diffuse reflections of the wheel are analysed with the help of two cameras 302 and 303.

It is to advantage that the individual lasers of the laser array 301 can be triggered individually. An analysis and control unit 305 is visible, which triggers the individual lasers of the laser array 301. When the lasers are triggered, the cameras 301 and 303 are triggered in synchrony in order to capture the corresponding images.

Figure 4:
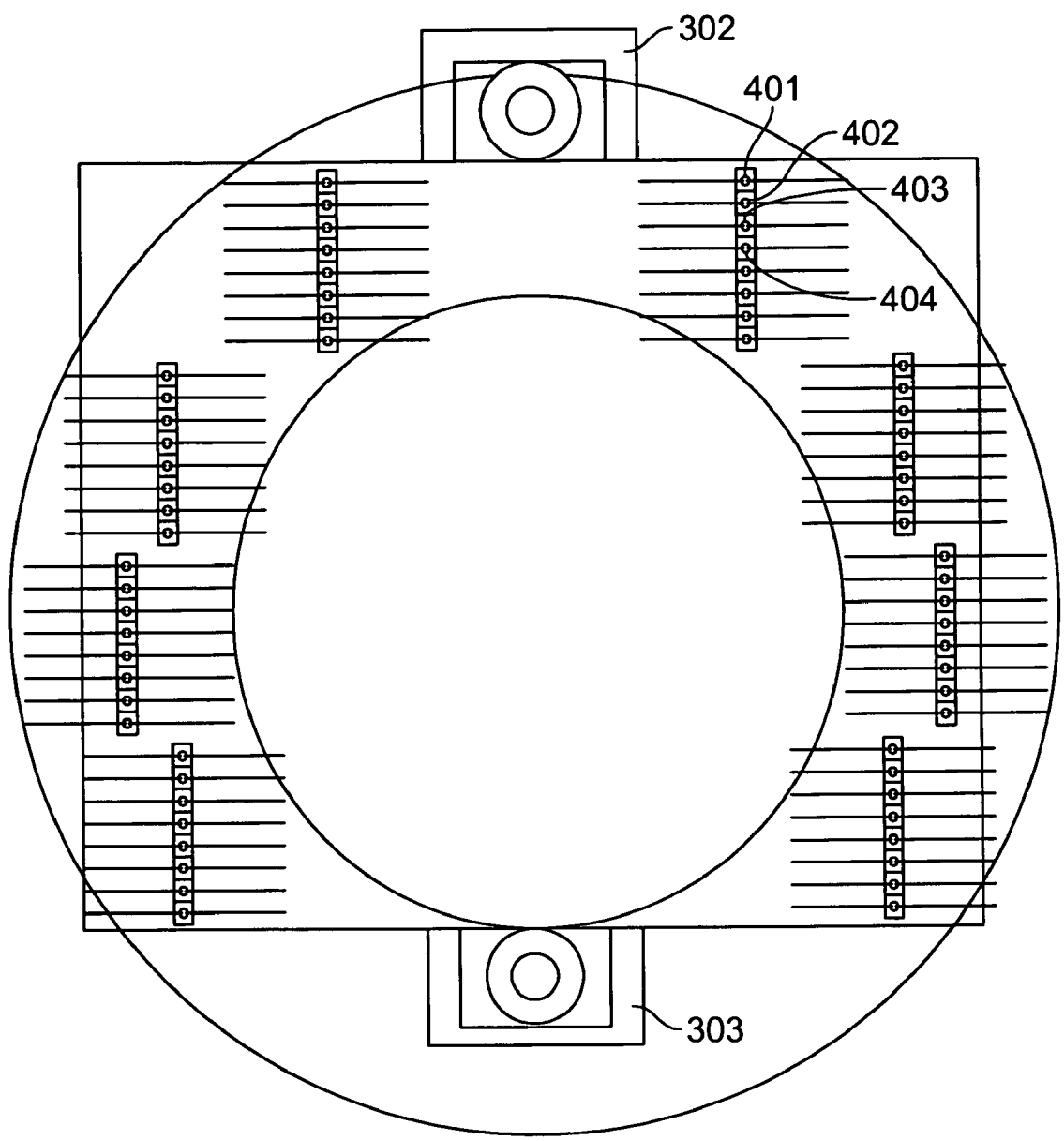
FIG. 4 illustrates a first configuration of individual lasers.

FIG. 4 shows a first configuration of individual lasers 401, 402, 403, 404. Not all the individual lasers are provided with a reference numeral. It can be seen that the individual lasers are arranged in groups, and that the individual groups lie, at least approximately, on the perimeter of a circle. This arrangement facilitates the projection of laser lines on the wheel.

In the embodiment of FIG. 4, 8 laser arrays are visible, each comprising 8 individual lasers. By virtue of the fact that the laser system can be swivelled, it is also possible to work with systems containing fewer lasers. It may then be necessary to perform the measurement at several different settings, which lengthens the time needed for wheel alignment.

Figure 5:
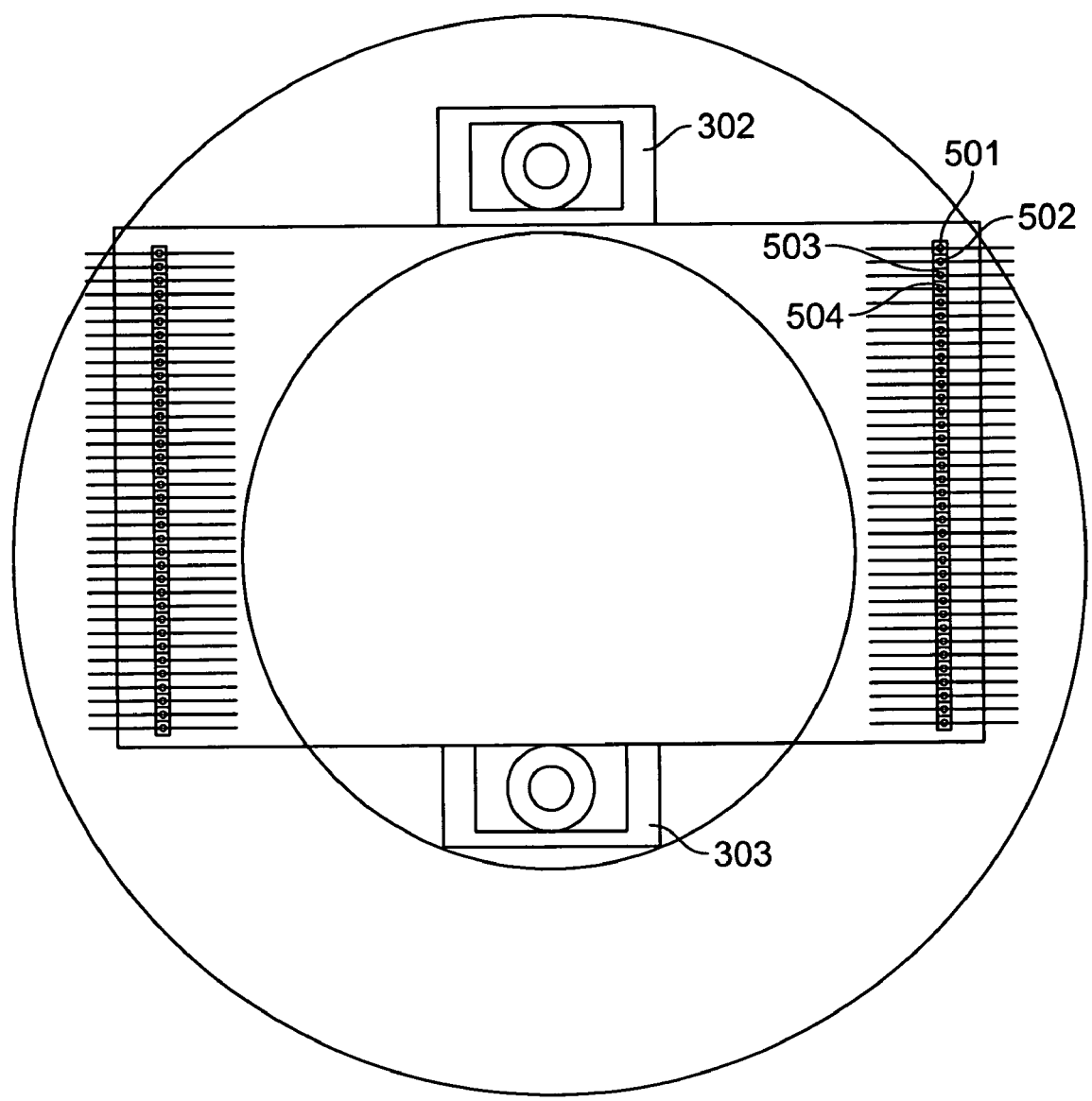
FIG. 5 illustrates another configuration of individual lasers.

FIG. 5 shows another configuration of individual lasers 501, 502, 503, 504, these being arranged along two lines. This laser configuration, too, can be swivelled.

The invention claimed is:

1. Method of determining a vehicle's axle geometry, in which light of a given structure is projected on a vehicle wheel (1) and the diffusely reflected light (2, 3, 4) is analyzed in order to determine therefrom the orientation of the vehicle-wheel plane,
wherein several lines of laser light generated by one or several laser-light sources (301, 401, 402, 403, 404, 501, 502, 503, 504) are projected on the wheel (1), one or several of these lines is/are faded in or out in temporal succession and the diffusely reflected light (2, 3, 4) is captured by means of one or by means of several cameras (302, 303).

2. Method according to claim 1, wherein the information as to which of the lines (2, 3, 4) has been faded out is supplied to an analyzing unit (305) along with an image captured by the camera or cameras (302, 303).

3. Method according to claim 1, wherein the lines (2, 3, 4) are generated by several laser-light sources (401, 402,403, 403, 501,502, 503, 504) that can be triggered individually (305).

4. Method according to, claim 1, wherein the lines (2, 3, 4) are at least substantially horizontal and wherein the position(s) of the laser-light source or laser-light sources (301, 401, 402, 403, 404, 501, 502, 503, 504) are changed in such manner that the lines (2, 3, 4) impinge successively on the wheel (1) at different heights.

* * * * *